United States Patent [19]

Schulenberg

[11] 3,717,638

[45] Feb. 20, 1973

[54] 1,2,3,4,6,7,12,12A-OCTAHYDRO-2-PHENYLPYRAZINO[2',1':6,1]PYRIDO[3,4-b]INDOLES AND INTERMEDIATES THEREFOR

[75] Inventor: John W. Schulenberg, Delmas, N.Y.

[73] Assignee: Sterling Drug, Inc., New York, N.Y.

[22] Filed: March 11, 1971

[21] Appl. No.: 123,425

Related U.S. Application Data

[62] Division of Ser. No. 831,750, June 9, 1969, Pat. No. 3,644,384.

[52] U.S. Cl....260/268 PC, 260/268 SY, 260/326.13
[51] Int. Cl.............................................C07d 51/70
[58] Field of Search.................................260/268 PC

[56] References Cited

UNITED STATES PATENTS 3,151,116   9/1964   de Stevens......................260/268 PC
3,468,890   9/1969   Archer..........................260/268 PC

OTHER PUBLICATIONS

Schulenberg et al., Chem. Abstr. Vol. 72, Col. 55396a (abstracting Jour. Med. Chem. Vol. 13, p. 145)

*Primary Examiner*—Donald G. Daus
*Attorney*—Elmer J. Lawson, B. Woodrow Wyatt, Thomas L. Johnson, Robert K. Bair, William G. Webb, Frederik W. Stonner and Theodore C. Miller

[57] ABSTRACT

New 1,2,3,4,6,7,12,12a-octahydro-2-phenyl-pyrazino[2',1':6,1]pyrido[3,4-b]indoles having useful psychomotor stimulant properties are prepared by thermal cyclization of a 2-(α-halo-lower-alkanoyl)-3-carbo-lower-alkoxy-1,2,3,4-tetrahydro-9H-pyrido[3,4-b]indole with an aniline derivative, and alkali metal aluminum hydride reduction of the resulting 1,2,3,4,6,7,12,12a-octahydro-1,4-dioxo-2-phenyl-pyrazino-[2',1':6,1]pyrido[3,4-b]indole.

6 Claims, No Drawings

1,2,3,4,6,7,12,12A-OCTAHYDRO-2-PHENYLPYRAZINO[2',1':6,1]PYRIDO[3,4-B] INDOLES AND INTERMEDIATES THEREFOR

This application is a division of my prior, co-pending application Ser. No. 831,750, filed June 9, 1969, now U.S. Pat. No. 3,644,384, patented Feb. 22, 1972.

ORGANIC COMPOUNDS AND THEIR PREPARATION

This invention relates to certain 1,2,3,4,6,7,12,12a-octahydro-2-phenylpyrazino[2',1':6,1]pyrido[3,4-b]indoles having the formula:

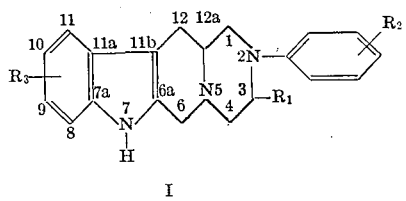

I where $R_1$ is hydrogen or lower-alkyl; and $R_2$ and $R_3$ each are hydrogen or methylenedioxy or ethylenedioxy attached to adjacent carbon atoms or from one to three members of the group consisting of halogen (including fluorine, chlorine, bromine, and iodine), lower-alkyl, lower-alkoxy, lower-alkylmercapto, amino, di-lower-alkylamino, tri-fluoromethyl, or hydroxy.

The compounds of formula I are useful as psychomotor stimulants as more fully described hereinafter.

As used herein the term "lower-alkyl" means saturated, monovalent hydrocarbon radicals, including straight or branched chain radicals of from one to six carbon atoms as illustrated by, but not limited to, methyl, ethyl, propyl, isopropyl, n-butyl, t-butyl, amyl, hexyl, and the like.

The compounds of formula I are prepared by reaction of a lower-alkyl 1,2,3,4-tetrahydro-9H-pyrido[3,4-b]indole-3-carboxylate of formula II with an α-halo-lower-alkanoyl halide; heating the resulting lower-alkyl 2-(α-halo-lower-alkanoyl)-1,2,3,4-tetrahydro-9H-pyrido[3,4-b]indole-3-carboxylate of formula III with an aniline derivative,

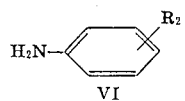

and reduction, with an alkali metal aluminum hydride, of the resulting 1,2,3,4,6,7,12,12a-octahydro-1,4-dioxo-2-phenylpyrazino-[2',1':6,1]pyrido[3,4-b]indole of formula IV. The reactions are represented by the equations:

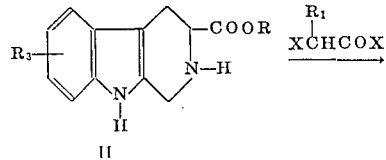

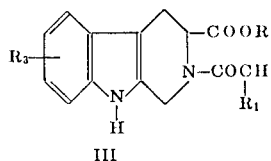

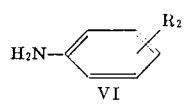

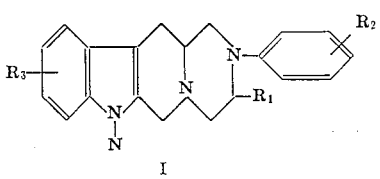

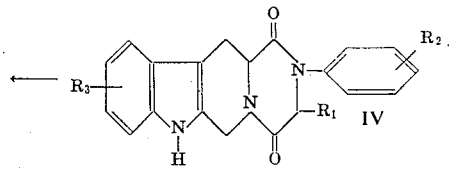

where $R_1$, $R_2$, and $R_3$ have the meanings given above, R represents lower-alkyl, and X represents halogen.

The reaction of the lower-alkyl 1,2,3,4-tetrahydro-9H-pyrido[3,4-b]indole-3-carboxylates of formual II with the α-halo-lower-alkanoyl halides to produce the compounds of formula III is carried out in an organic solvent inert under the conditions of the reaction, for example chloroform, methylene dichloride, ethylene dichloride, benzene, toluene, dioxane, and the like, and at a temperature of from around 10°C. to about 100°C.

The reaction of the lower-alkyl 2-(α-halo-lower-alkanoyl)-1,2,3,4-tetrahydro-9H-pyrido[3,4-b]indole-3-carboxylates of formula III with an aniline derivative of formula VI to produce the compounds of formula IV is generally carried out by heating the reactants in a high boiling polar solvent, for example 2-ethoxyethanol, propylene glycol, ethylene glycol, and the like. The reaction is preferably carried out at the boiling point of the solvent used.

The reduction of the 1,2,3,4,6,7,12,12a-octahydro-1,4-dioxo-2-phenylpyrazino[2',1':6,1]pyrido[3,4-b]indoles of formula IV to the final products of formula I is generally carried out at a temperature in the range from about 20° to about 80°C. in an organic solvent inert under the conditions of the reaction, for example diethyl ether or tetrahydrofuran. It is preferred to carry out the reaction in tetrahydrofuran at the boiling point thereof.

The lower-alkyl 1,2,3,4-tetrahydro-9H-pyrido[3,4-b]indole-3-carboxylates of formula II are generally known compounds and are prepared from known tryptophanes having formula V:

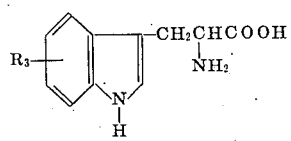

V by reaction of the latter with in i the presence of a basic catalyst, and esterification of the resulting 1,2,3,4-tetrahydro-9H-pyrido[3,4-b]indole-3-carboxylic acid with a lower-alkanol in the presence of an acid catalyst.

Due to the presence of two basic amino nitrogen atoms, the compounds of formula I form acid-addition salts. The compounds of formula I, in free base form, are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbonates. The bases thus regenerated can then be interacted with the same or a different acid to give back the same or different acid-addition salt. Thus the novel bases and all of their acid-addition salts are readily interconvertible.

The salts are useful as characterizing or identifying derivatives of the free bases or in isolation or purification procedures. Such characterizing or purification acid-addition salt derivatives, like all of the acid-addition salts, can if desired, be used to regenerate the free bases by reaction of the salts with aqueous base, or alternatively the acid-addition salt can be converted to a different characterizing or identifying salt by, for example, ion-exchange procedures. Therefor although toxicity, insolubility, or lack of crystalline character may make some particular salt species unsuitable or less desirable for use as such in a given identification or purification procedure, such salts can be converted to the free base by decomposition of the acid-addition salt with aqueous base as explained, or alternatively, the acid-addition salt can be converted to a more suitable salt species by double decomposition reactions involving the anion, for example, by ion-exchange procedures.

It will be appreciated from the foregoing that all of the acid-addition salts of the new bases are useful and valuable compounds regardless of considerations of toxicity, solubility, physical form, and the like.

The novel features of the compounds of the invention, then, reside in the concept of the bases and the cationic forms of the new compounds of formula I and not in any particular acid moiety or anion associated with the salt forms of the compounds; rather, the acid moieties or anions which can be associated in the salt forms are in themselves neither novel nor critical and therefore can be any anion or acid-like substance capable of salt formation with bases. In fact, in aqueous solutions, the base form or water-soluble acid-addition salt form of the compounds of the invention both possess a common protonated cation or ammonium ion.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, or boron trifluoride. Example The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentra-tion of the solution.

Pharmacological evaluation of the compounds of formula I according to standard pharmacological test procedures has demonstrated that they possess psychomotor stimulant activity, thus indicating their use to combat depressed states, e.g. as psychic energizes. Similarly, pharmacological evaluation of the compounds of formula IV according to standard pharmacological test procedures has demonstrated that they possess psychomotor depressant activity, thus indicating their usefulness as C.N.S. depressants, for example, as tranquilizers.

The psychomotor depressant and stimulant activities of the compounds of formulas I and IV were determined in standard activity cages using the method of Dews, Brit. J. Pharmacol. 8, 46 (1953) in which mice, medicated with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction or an increase in the number of counts in the medicated mice over control groups, run simultaneously, is taken as evidence of psychomotor depressant or psychomotor stimulant activities, respectively. The dose at which such reduction or increase in motor activity is observed is recorded as the active dose. Alternatively, the $ED_{50}$, the Effective Dose in 50 percent of the animals, is determined from a dose-response curve.

Instead of determining the motor activity of the test animals using a digital counter activated by a photoelectric cell, there can also be used a counting apparatus such as described by Bonta et al., Arch. int. pharmocodyn. 129, 381-394 (1960) in which vertically movable leaf springs affixed to the activity cages activate a direct current ampere hour meter which serves as a counter of the recorded activity. Moreover, as these authors show, compounds which depress motor activity of mice in such activity cages are indicated to possess tran-quilizer activity. The method is also shown to be applicable in determining the activity of tremor inducing substances, i.e. C.N.S. stimulants, which are useful pharmacological tools for investigating anti-Parkinson drugs.

The compounds of formulas I and IV of the invention, when administered orally to mice in the above-described psychomotor activity test, were found to be active in the dose range of from 8 to 300 mg./kg. of body weight.

The compounds can be prepared for use by dissolving or suspending them in aqueous alcohol, glycol or oil solution, or oil-in-water emulsions in the same manner as conventional medicinal substances are prepared. Alternatively, they can be incorporated in unit dosage form as tablets or capsules for oral administration either alone or in combination with suitable adjuvants such as calcium carbonate, starch, lactose, talc, magnesium stearate, gum acacia, and the like. The compounds are administered to any suitable mammalian host in a dose range of 2–100 mg./kg.

The chemical structures of the compounds of the invention are established by their mode of synthesis and are corroborated by infrared and ultraviolet spectra and by the correspondence between calculated values for the elements and values found by chemical analysis.

The following examples will further illustrate specific embodiments of the invention. The melting points are uncorrected.

EXAMPLE 1

Ethyl 2-/α-chloroacetyl)-1,2,3,4-tetrahydro-9H-pyrido[3,4-b]-indole-3-carboxylate [III: $R_1$ is H; $R_3$ is H; R is $C_2H_5$].

To a stirred solution of 10.01 g. (0.04 mole) of ethyl 1,2,3,4-tetrahydro-9H-pyrido[3,4-b]indole-3-carboxylate in 200 ml. of chloroform was added with stirring over a period of forty minutes, a solution of 7.5 ml. (0.10 mole) of a chloroacetyl chloride in 15 ml. of chloroform. When addition was complete, the mixture was stirred for an additional 10 minutes at room temperature, and then stirred under reflux for 6 hours. The mixture was then diluted with 20 ml. of isopropanol, evaporated to dryness, and the greenish tan solid residue was recrystallized from a benzene/heptane mixture giving 11 g. of ethyl 2-(α-chloroacetyl)-1,2,3,4,-tetrahydro-9H-pyrido[3,4-b]-indole-3-carboxylate, m.p. 150.2°–152,8°C. (corr.). Anal, Calcd. for $C_{16}H_{17}ClN_2O_3$: Cl, 11.06; N, 8.74.
Found: Cl, 11.37; N, 8.93.

EXAMPLE 2

Ethyl 2-(α-chloroacetyl)-7-methoxy-1,2,3,4-tetrahydro-9H-pyrido -[3,4-b]indole -3-carboxylate [III: $R_1$ is H; $R_3$ is 7-$CH_3O$; R is $C_2H_5$] is prepared by reaction of α-chloroacetyl chloride with ethyl 7-methoxy-1,2,3,4-tetrahydro-9H-pyrido[3,4-b]indole-3-carboxylate (prepared by reaction of formaldehyde with 6-methoxytryptophane and esterification of the resulting carboxylic acid with ethanol) using the procedure described above in Example 1.

EXAMPLE 3

Ethyl 2-(α-chloroacetyl)-6,7-dimethoxy-1,2,3,4-tetrahydro-9H -pyrido[3,4-b]indole-3-carboxylate [III: $R_1$ is H; $R_3$ is 6,7-$(CH_3O)_2$; R is $C_2H_5$] is prepared by reaction of α-chloroacetyl chloride with ethyl 6,7-dimethoxy-1,2,3,4-tetrahydro-9H-pyrido -[3,4-b]indole-3-carboxylate (prepared by reaction of formaldehyde with 5,6-dimethoxytryptophane and esterification of the resulting carboxylic acid with ethanol) using the procedure described above in Example 1.

EXAMPLE 4

Ethyl 2-(α-chloroacetyl)-6-ethoxy-1,2,3,4-tetrahydro-9H-pyrido- [3,4-b]indole-3-carboxylate [III: $R_1$ is H; $R_3$ is 6-$C_2H_5O$; R is $C_2H_5$] is prepared by reaction of α-chloroacetyl chloride with ethyl 6-ethoxy-1,2,3,4,-tetrahydro-9H-pyrido[3,4-b]indole-3-carboxylate (prepared by reaction of formaldehyde with 5-ethoxy -tryptophane and esterification of the resulting carboxylic acid with ethanol) using the procedure described above in Example 1.

EXAMPLE 5

Ethyl 2-(α-chloroacetyl)-7-methyl-1,2,3,4-tetrahydro-9H-pyrido-[3,4-b]indole-3-carboxylate [III: $R_1$ is H; $R_3$ is 7-$CH_3$; R is $C_2H_5$] is prepared by reaction of α-chloroacetyl chloride with ethyl 7-methyl-1,2,3,4-tetrahydro-9H-pyrido[3,4-b]indole-3-carboxylate (prepared by reaction of formaldehyde with 6-methyltryptophane and esterification of the resulting carboxylic acid with ethanol) using the procedure described above Example 1.

EXAMPLE 6

Ethyl 2(α-chloroacetyl)-5,7-dimethyl-1,2,3,4-tetrahydro-9H-pyrido[3,4-b]indole-3-carboxylate [III: $R_1$ is H; $R_3$ is 5,7-$(CH_3)_2$; R is $C_2H_5$] is prepared by reaction of α-chloroacetyl chloride with ethyl 5,7-dimethyl-1,2,3,4-tetrahydro-9H-pyrido[3,4-b]indole-3-carboxylate (prepared by reaction of formaldehyde with 4,6-dimethyltryptophane and esterification of the resulting carboxylic acid with ethanol) using the procedure described above Example 1.

EXAMPLE 7

Ethyl 2-(α-chloroacetyl)-6-benzyloxy-1,2,3,4-tetrahydro-9H-pyrido[3,4-b]indole-3-carboxylate [III: $R_1$ is H; $R_3$ is 6-$C_6H_5CH_2O$; R is $C_2H_5$] is prepared by reaction of α-chloroacetyl chloride with ethyl 6-benzyloxy-1,2,3,4-tetrahydro-9H-pyrido-[3,4-b]indole-3-carboxylate (prepared by reaction of formaldehyde with 5-benzyloxy tryptophane and esterification of the resulting carboxylic acid with ethanal) using the procedure described above in Example 1.

EXAMPLE 8

Ethyl 2-(α-chloropropionyl)-7-chloro-1,2,3,4-tetrahydro-9H-pyrido[3,4-b]indole-3-carboxylate [III: $R_1$ is $CH_3$; $R_3$ is 7-Cl; R is $C_2H_5$] is prepared by reaction of α-chloropropionyl chloride with ethyl 7-chloro-1,2,3,4-tetrahydro-9H-pyrido[3,4-b]indole-3-carboxylate (prepared by reaction of formaldehyde with 6-chlorotryptophane and esterification of the resulting carboxylic acid with ethanol) using the procedure described above in Example 1.

EXAMPLE 9

Ethyl 2-(α-chloroacetyl)-6-bromo-1,2,3,4-tetrahydro-9H-pyrido-[3,4-b]indole-3-carboxylate [III: $R_1$ is H; $R_3$ is 6Br; R is $C_2H_5$] is prepared by reaction of α-chloroacetyl chloride with ethyl 6-bromo-1,2,3,4-tetrahydro-9H-pyrido[3,4-b]indole-3-carboxylate (prepared by reaction of formaldehyde with 5-bromotryptophane esterification of the resulting carboxylic acid with ethanol) using the procedure described above in Example 1.

EXAMPLE 10

Ethyl 2-(α-chloroacetyl)-6-fluoro-1,2,3,4-tetrahydro-9H-pyrido-[3,4-b]indole-3-carboxylate [III: $R_1$ is H: $R_3$ is 6-F; R is $C_2H_5$] is prepared by reaction of α-chloroacetyl chloride with ethyl 6-fluoro-1,2,3,4-tetrahydro-9H-pyrido[3,4-b]indole-3-carboxylate (prepared by reaction of formaldehyde with 5- fluorotryptophane and esterification of the resulting carboxylic acid with ethanol) using the procedure described above in Example 1.

EXAMPLE 11

Ethyl 2-($\alpha$-chloroacetyl)-6-ido-1,2,3,4-tetrahydro-9H-pyrido-[3,4-b]indole-3-carboxylate [III: $R_1$ is H; $R_3$ is 6-I; R is $C_2H_5$] is prepared by reaction of $\alpha$-chloroacetyl chloride with ethyl 6-iodo-1,2,3,4-tetrahydro-9H-pyrido[3,4-b]indole-3-carboxylate (prepared by reaction of formaldehyde with 5-iodotryptophane esterification of the resulting carboxylic acid with ethanol) using the procedure described above in Example 1.

EXAMPLE 12

Ethyl 2($\alpha$-chlorobutyryl)-7-hydroxy-1,2,3,4-tetrahydro-9H-pyrido-[3,4-b]indole-3-carboxylate [III: $R_1$ is $C_2H_5$; $R_3$ is 7-HO; R is $C_2H_5$] is prepared by reaction of $\alpha$-chlorobutyryl chloride with ethyl 7-hydroxy-1,2,3,4-tetrahydro-9H-pyrido[3,4-b]indole-3-carboxylate (prepared by reaction of formaldehyde with 6-hydroxy-tryptophane and esterification of the resulting carboxylic acid with ethanol) using the procedure described above in Example 1.

EXAMPLE 13

Ethyl 2-($\alpha$-chloroacetyl)-7-trifluoromethyl-1,2,3,4-tetrahydro-9H-pyrido[3,4-b]indole-3-carboxylate [III: $R_1$ is H; $R_3$ is 7-$CF_3$; R is $C_2H_5$] is prepared by reaction of $\alpha$-chloroacetyl chloride with ethyl 7-trifluoromethyl-1,2,3,4-tetrahydro-9H-pyrido[3,4-b]-indole-3-carboxylate (prepared by reaction of formaldehyde with 6trifluoromethyltryptophane and esterification of the resulting carboxylic acid with ethanol) using the procedure described above in Example 1.

The 6-trifluoromethyltryptophane in turn is prepared by reaction of 6-trifluoromethylindole with formaldehyde and dimethylamine, reacting the resulting gramine derivative with ethyl $\alpha$-acetylaminomalonate in the presence of two equivalents of dimethyl sulfate and one equivalent of sodium ethoxide, and refluxing the resulting malonic ester derivative in dilute sulfuric acid to effect simultaneous hydrolysis of the ester and the acetylamino groups as well as decarboxylation of one of the carboxyl functions, all as known in the art.

EXAMPLE 14

Ethyl 2-($\alpha$-chloroacetyl)-6-methylmercapto-1,2,3,4-tetrahydro-9H-pyrido[3,4-b]indole-3-carboxylate [III: $R_1$ is H; $R_3$ is 6-$CH_3$S; R is $C_2H_5$] is prepared by reaction of $\alpha$-chloroacetyl chloride with ethyl 6-methylmercapto-1,2,3,4-tetrahydro-9H-pyrido[3,4-b]-indole-3-carboxylate (prepared by reaction of formaldehyde with 5-methylmercaptotryptophane esterification of the resulting carboxylic acid with ethanol) using the procedure described above in Example 1.

The 5-methylmercaptotryptophane in turn is prepared by reaction of 5-methylmercaptoindole with formaldehyde and dimethylamine in the presence of two equivalents of dimethyl sulfate and one equivalent of sodium ethoxide, reacting the resulting gramine derivative with ethyl $\alpha$-acetylaminomalonate, and refluxing the resulting malonic ester derivative in dilute sulfuric acid to effect simultaneous hydrolysis of the ester and acetylamino groups as well as decarboxylation of one of the carboxyl functions, all as known in the art.

EXAMPLE 15

Ethyl 2-($\alpha$-chloroacetyl)-6,7-methylenedioxy-1,2,3,4-tetrahydro-9H-pyrido[3,4-b]indole-3-carboxylate [III: $R_1$ is H; $R_3$ is 6,7-$OCH_2O$; R is $C_2H_5$] is prepared by reaction of $\alpha$-chloroacetyl chloride with ethyl 6,7-methylenedioxy-1,2,3,4-tetrahydro-9H-pyrido[3,4-b]indole-3-carboxylate (prepared by reacting formaldehyde with 5,6-methylenedioxytryptophane and esterification of the resulting carboxylic acid with ethanol) using the procedure described above in Example 1.

The 5,6-methylenedioxytryptophane in turn is prepared by reaction of 5,6-methylenedioxyindole with formaldehyde and dimethylamine in the presence of two equivalents of dimethyl sulfate and one equivalent of sodium ethoxide, reacting the resulting gramine derivative with ethyl $\alpha$-acetylaminomalonate, and refluxing the resulting malonic ester derivative in dilute sulfuric acid to effect simultaneous hydrolysis of the ester and acetylamino groups as well as decarboxylation of one of the carboxyl functions, all as known in the art.

EXAMPLE 16

Ethyl 2-($\alpha$-chloroacetyl)-7-amino-1,2,3,4-tetrahydro-9H-pyrido-[3,4-b]indole-3-carboxylate [III: $R_1$ is H; $R_3$ is 7-$NH_2$; R is $C_2H_5$] is prepared by reaction of $\alpha$-chloroacetyl chloride with ethyl 7-amino-1,2,3,4-tetrahydro-9H-pyrido[3,4-b]indole-3-carboxylate (prepared by reaction of formaldehyde with 6-aminotryptophane and esterification of the resulting carboxylic acid with ethanol) using the procedure described above in Example 1.

EXAMPLE 17

Ethyl 2-($\alpha$-chloroacetyl)-6-dimethylamino-1,2,3,4-tetrahydro-9H-pyrido[3,4-b]indole-3-carboxylate [III: $R_1$ is H; $R_3$ is 6-$(CH_3)_2N$; R is $C_2H_5$] is prepared by reaction of $\alpha$-chloroacetyl chloride with ethyl 6-dimethylamino-1,2,3,4-tetrahydro-9H-pyrido[3,4-b]indole-3-carboxylate (prepared by reaction of formaldehyde with 5-dimethylaminotryptophane and esterification of the resulting carboxylic acid with ethanol) using the procedure described above in Example 1.

EXAMPLE 18

Ethyl 2-($\alpha$-chloroacetyl)-6-methyl-8-chloro-1,2,3,4-tetrahydro-9H-pyrido[3,4-b]indole-3-carboxylate [III: $R_1$ is H; $R_3$ is 6-$CH_3$-8-Cl; R is $C_2H_5$] is prepared by reaction of $\alpha$-chloroacetyl chloride with ethyl 6-methyl-8-chloro-1,2,3,4-tetrahydro-9H-pyrido[3,4-b]indole-3-carboxylate (prepared by reaction of formaldehyde with 5-methyl-7-chlorotryptophane and esterification of the resulting carboxylic acid with ethanol) using the procedure described above in Example 1.

EXAMPLE 19

Ethyl 2-(α-chloroacetyl)-6,7-ethylenedioxy-1,2,3,4-tetrahydro-9H-pyrido[3,4-b]indole-3-carboxylate [III: $R_1$ is H; $R_3$ is 6,7-OCH$_2$CH$_2$O; R is C$_2$H$_5$] is prepared by reaction of α-chloroacetyl chloride with ethyl 6,7-ethylenedioxy-1,2,3,4-tetrahydro-9H-pyrido[3,4-b]indole-3-carboxylate (prepared by reaction of formaldehyde with 5,6-ethylenedioxytryptophane and esterification of the resulting carboxylic acid with ethanol) using the procedure described above in Example 1.

The 5,6-ethylenedioxytryptophane in turn is prepared by reaction of 5,6-methylenedioxyindole with formaldehyde and dimethylamine, reacting the resulting gramine derivative with ethyl α-acetylaminomalonate in the presence of two equivalents of dimethyl sulfate and one equivalent of sodium ethoxide, and refluxing the resulting malonic ester derivative in dilute sulfuric acid to effect simultaneous hydrolysis of the ester and acetylamino groups as well as decarboxylation of one of the carboxyl functions, all as known in the art.

EXAMPLE 20

1,2,3,4,6,7,12,12a-Octahydro-1,4-dioxo-2-phenyl-pyrazino-[2',1':6,1]pyrido[3,4-b]indole [IV: $R_1$, $R_2$, and $R_3$ are H].

A mixture of 6.42 g. (0.02 mole) of ethyl 2-(α-chloroacetyl)-1,2,3,4-tetrahydro-9H-pyrido[3,4-b]indole-3-carboxylate and 2.35 ml. (0.04 mole) of aniline in 100 ml. of 2-ethoxyethanol was heated and stirred under reflux for eighteen hours, and the reaction mixture was then concentrated to a volume of 40 ml. in vacuo. The residual brown suspension was diluted with 400 ml. of ethyl acetate, the mixture washed four times with water, then three times with saturated sodium chloride solution, dried briefly over magnesium sulfate, filtered, and taken to dryness in vacuo. The residue was once again dissolved in 250 ml. of hot ethyl acetate, and the mixture was chilled and filtered to remove a small amount of tan insoluble material. The filtrate was chromatographed on a column of 350 g. of silica gel, and the column eluted with ethyl acetate, 500 ml. fractions of eluate being collected. The first one liter of eluate afforded a small amount of a brown glass and some solid which was discarded, and the next liter afforded a total of about three grams of a tan solid. The latter was recrystallized from ethyl acetate to give 2.12 g. of 1,2,3,4,6,7,12,12a-octahydro-1,4-dioxo-2-phenyl-pyrazino[2',1':6,1]pyrido[3,4-b]indole, m.p. 252.2°–253.4°C. (corr.).

Anal. Calcd. for $C_{20}H_{17}N_3O_2$: C, 72.49; H, 5.17; N, 12.69.

Found: C, 72.19; H, 5.35; N, 12.35.

EXAMPLE 21

1,2,3,4,6,7,12,12a-Octahydro-1,4-dioxo-9-methoxy-2(4-bromophenyl)pyrazino[2',1':6,1]pyrido[-b]indole [IV: $R_1$ is H; $R_2$ is 4-Br; $R_3$ is 9-CH$_3$O] is prepared by reaction of ethyl 2-(α-chloroacetyl)-7-methoxy-1,2,3,4-tetrahydro-9H-pyrido-[3,4-b]indole-3-carboxylate with 4-bromonaniline in 2-ethoxyethanol using the procedure described above in Example 20.

EXAMPLE 22

1,2,3,4,6,7,12,12a-Octahydro-1,4-dioxo-9,10-dimethoxy-2-(2,4-difluorophenyl)pyrazino[2',1':6,1]pyrido[cz3,4-b]indole [IV: $R_1$ is H; $R_2$ is 2,4-F$_2$; $R_3$ 9,10-(CH$_3$O)$_2$] is prepared by reaction of ethyl 2-(α-chloroacetyl)-6,7-dimethoxy-1,2,3,4-tetrahydro-9H-pyrido[3,4-b]indole-3-carboxylate with 2,4-difluoroaniline in 2-ethoxyethanol using the procedure described above in Example 20.

EXAMPLE 23

1,2,3,4,6,7,12,12a-Octahydro-1,4-dioxo-10-ethoxy-2-(4-chlorophenyl)pyrazino[2',1':6,1]pyrido[3,4-b]indole [IV: $R_1$ is H; $R_2$ is 4-Cl; $R_3$ is 10-C$_2$H$_5$O] is prepared by reaction of ethyl 2-(α-chloroacetyl)-6-ethoxy-1,2,3,4-tetrahydro-9H-pyrido[3,4-b]-indole-2-carboxylate with 4-chloroaniline in 2-ethoxyethanol using the procedure described above in Example 20.

EXAMPLE 24

1,2,3,4,6,7,12,12a-Octahydro-1,4-dioxo-9-methyl-2-(3-methylmercepatophenyl)pyrazino[2',1':6,1]pyrido[3,4-b]indole [IV: $R_1$ is H; $R_2$ is 3-CH$_3$S; $R_3$ is 9-CH$_3$] is prepared by reaction of ethyl 2-(α-chloroacetyl)-7-methyl-1,2,3,4-tetrahydro-9H-pyrido-[3,4-b]indole-3carboxylic with 3-methylmercaptoaniline in 2-ethoxyethanol using the procedure described in Example 20.

EXAMPLE 25

1,2,3,4,6,7,12,12a-Octahydro-1,4-dioxo-9,11-dimethyl-2-[4-(N,N-dimethylamino)phenyl]pyrazino[2',1':6,1]pyrido[3,4-b]indole [IV: $R_1$ is H; $R_2$ is 4-(CH$_3$)$_2$N; $R_3$ is 9,11-(CH$_3$)$_2$] is prepared by reaction of ethyl 2-(α-chloroacetyl)-5,7-dimethyl-1,2,3,4-tetrahydro-9H-pyrido[3,4-b]indole-3-carboxylate with 4-(N,N-dimethylamino)aniline in 2-ethoxyethanol using the procedure described above in Example 20.

EXAMPLE 26

1,2,3,4,6,7,12,12a-Octahydro-1,4-dioxo-10-benzyloxy-2-(3-trifluoromethylphenyl)pyrazino [2',1':6,1] pyrido [3,4-b] indole [IV: $R_1$ is H; $R_2$ is 3-CF$_3$; $R_3$ is 10-C$_6$H$_5$CH$_2$O] is prepared by reaction of ethyl 2-(α-chloroacetyl)-6-benzyloxy-1,2,3,4-tetrahydro-9H-pyrido[3,4-b]indole-3-carboxylate with 3-trifluoromethylaniline in 2-ethoxyethanol using the procedure described above in Example 20.

EXAMPLE 27

1,2,3,4,6,7,12,12a-Octahydro-1,4-dioxo-9chloro-3-methyl-2-(2,4,6-trimethylphenyl)pyrazino[2',1':6,1]pyrido[3,4-b]indole [IV: $R_1$ is Ch$_3$; $R_2$ is 2,4,6-(CH$_3$)$_3$; $R_3$ is 9-Cl] is prepared by reaction of ethyl 2-(α-chloropropionyl)-7-chloro-1,2,3,4-tetrahydro-9H-pyrido[3,4-b]indole-3-carboxylate with 2,4,6-trimethylaniline in 2-ethoxyethanol using the procedure described above in Example 20.

EXAMPLE 28

1,2,3,4,6,7,12,12a-Octahydro-1,4-dioxo-10-bromo-2-(3,4-methylenedioxyphenyl)pyrazino[2',1':6,1]pyrido[cz3,4-b]indole [IV: $R_1$ is H; $R_2$ is 3, OCH$_2$O; $R_3$ is 10-Br] is prepared by reaction of ethyl 2-

($\alpha$-chloroacetyl)-6-bromo-1,2,3,4-tetrahydro-9H-pyrido-[3,4-b]indole-3-carboxylate with 3,4-methylenedioxyaniline in 2-ethoxyethanol using the procedure described above in Example 20.

Example 29

1,2,3,4,6,7,12,12a-Octahydro-1,4-dioxo-10-fluoro-2-(3,4-ethylenedioxyphenyl)pyrazino[2',1':6,1]pyrido[3,4-b]indole [IV: $R_1$ is H; $R_2$ is 3,4-OCH$_2$ CH$_2$O; $R_3$ is 10-F] is prepared by reaction of ethyl 2($\alpha$-chloroacetyl)-6-fluoro-1,2,3,4-tetrahydro-9H-pyrido-[3,4-b]indole-3-carboxylate with 3,4-ethylenedioxyaniline in 2-ethoxyethanol using the procedure described in Example 20.

EXAMPLE 30

1,2,3,4,6,7,12,12a-Octahydro-1,4-dioxo-10-iodo-2-(3,4-diethoxyphenyl)pyrazino[2',1':6,1]pyrido[-b]indole [IV: $R_1$ is H; $R_2$ is 3,4-($C_2H_5O$)$_2$; $R_3$ is 10-I] is prepared by reaction of ethyl 2($\alpha$-chloroacetyl)-6-iodo-1,2,3,4-tetrahydro-9H-pyrido-[3,4-b]indole-3-carboxylate with 3,4-diethoxyaniline in 2-ethoxyethanol using the procedure described above in Example 20.

EXAMPLE 31

1,2,3,4,6,7,12,12a-Octahydro-1,4-dioxo-3-ethyl-9-hydroxy- 2-(4-isopropylphenyl)pyrazino[2',1':6,1]pyrido[3,4-b]indole [IV: $R_1$ is $C_2H_5$; $R_2$ is 4-($CH_3$)$_2$CH; $R_3$ is 9-HO] is prepared by reaction of ethyl 2-($\alpha$-chlorobutyrl)-7-hydroxy-1,2,3,4-tetrahydro-9H-pyrido-[3,4-b]indole-3-carboxylate with 4-isopropylaniline in 2-ethoxyethanol using the procedure described above in Example 20.

EXAMPLE 32

1,2,3,4,6,7,12,12a-Octahydro-1,4-dioxo-9-trifluoromethyl-2-(3-hydroxyphenyl)pyrazino[2',1':6,1]indole [IV: $R_1$ is H; $R_2$ is 3-HO; $R_3$ is 9-CF$_3$] is prepared by reaction of ethyl 2-($\alpha$-chloroacetyl)-7-trifluoromethyl-1,2,3,4-tetrahydro-9H-pyrido[3,4-b]indole-3-carboxylate with 3-hydroxyaniline in 2-ethoxyethanol using the procedure described above in Example 20.

EXAMPLE 33

1,2,3,4,6,7,12,12a-Octahydro-1,4-dioxo-10-methylmercapto-2-phenylpyrazino[2',1':6,1]pyrido[3,4-b]indole [IV: $R_1$ is H; $R_2$ is H; $R_3$ is 10-CH$_3$S] is prepared by reaction of ethyl 2-($\alpha$-chloroacetyl)-6-methylmercapto-1,2,3,4-tetrahydro-9H-pyrido-[3,4-b]indole-3-carboxylate with aniline in 2-ethoxyethanol using the procedure described above in Example 20.

EXAMPLE 34

1,2,3,4,6,7,12,12a-Octahydro-1,4-dioxo-9,10-methylenedioxy-2-phenylpyrazino[2',1':6,1]pyrido[3,4]indole [IV: $R_1$ is H; $R_2$ is H; $R_3$ is 9,10-OCH$_2$O] is prepared by reaction of ethyl 2-($\alpha$-chloroacetyl)-6,7-methylenedioxy-1,2,3,4,-tetrahydro-9H-pyrido[3,4-b]indole-3-carboxylate with aniline in 2-ethoxyethanol using the procedure described above in Example 20.

EXAMPLE 35

1,2,3,4,6,7,12,12a-Octahydro-1,4-dioxo-9-amino-2-phenylpyrazino-[2',1':6,1]pyrido[3,4-b]indole [IV: $R_1$ is H; $R_2$ is H; $R_3$ is 9-NH$_2$] is prepared by reaction of ethyl 2-($\alpha$-chloroacetyl)-7-amino-1,2,3,4-tetrahydro-9H-pyrido[3,4-b]indole-3-carboxylate with aniline in 2-ethoxyethanol using the procedure described above in Example 20.

EXAMPLE 36

1,2,3,4,6,7,12,12a-Octahydro-1,4-dioxo-10-dimethylamino-2-phenylpyrazino[2',1':6,1]pyrido[3,4-b]indole [IV: $R_1$ is H; $R_2$ is H; $R_3$ is 10-(CH$_3$)$_2$N] is prepared by reaction of ethyl 2-($\alpha$-chloroacetyl)-6-dimethylamino-1,2,3,4-tetrahydro-9H-pyrido-[3,4-b]indole-3-carboxylate with aniline in 2-ethoxyethanol using the procedure described above in Example 20.

EXAMPLE 37

1,2,3,4,6,7,12,12a-Octahydro-1,4-dioxo-10-methyl-8-chloro-2-phenylpyrazino[2',1':6,1]pyrido[-b]indole [IV; $R_1$ is H; $R_2$ is H; $R_3$ is 10-CH$_3$-8-Cl] is prepared by reaction of ethyl 2-($\alpha$-chloroacetyl)-6-methyl-8-chloro-1,2,3,4-tetrahydro-9H-pyrido[3,4-b]indole-3-carboxylate with aniline in 2-ethoxyethanol using the procedure described above in Example 20.

EXAMPLE 38

1,2,3,4,6,7,12,12a-Octahydro-1,4-dioxo-9,10-ethylenedioxy-2-phenylpyrazino[2',1':6,1]pyrido[3,4-b]indole [IV: $R_1$ is H; $R_2$ is H; $R_3$ is 9,10-OCH$_2$CH$_2$O] is prepared by reaction of ethyl 2-($\alpha$-chloroacetyl)-6,7-ethylenedioxy-1,2,3,4-tetrahydro-9H-pyrido[3,4-b]indole-3-carboxylate with aniline in 2-ethoxyethanol using the procedure described above in Example 20.

EXAMPLE 39

1,2,3,4,6,7,12,12a-Octahydro-2-phenylpyrazino[2',1':6,1]pyrido-[3,4-b]indole [I: $R_1$, $R_2$, and $R_3$ are H].

A mixture of 5.70 g. (0.017 mole) of 1,2,3,4,6,7,12,12a-octahydro-1,4-dioxo-2-phenyl-pyrazino[2',1':6,1]pyrido[[3,4-b]-indole and 3.26 g. (0.09 mole) of lithium aluminum hydride in 500 ml. of tetrahydrofuran was heated and stirred under reflux for 48 hours, then cooled, diluted with 100 ml. of diethyl ether, the excess hydride decomposed by the careful addition of 6.5 ml. of water in tetrahydrofuran, and the mixture filtered. The filter was was slurried four times with hot tetrahydrofuran, the mixture filtered, and the combined filtrates taken to dryness in vacuo. The residue was suspended in benzene, and the suspension was placed on a column of 300 g. of silica gel. The first two and one half liters of eluate, eluted with benzene, and the next four and one half liters, eluted with a mixture of 25 percent diethyl ether in benzene, were discarded. The next three liters of eluate, likewise eluted with 25 percent diethyl ether in benzene, were collected and added to the next liter and a half of eluate consisting of 50 percent diethyl ether in benzene, the next six and a half liters consisting of 75 percent diethyl ether in benzene, and the next liter and a half consisting of diethyl ether alone. The residues remaining after evaporation to dryness of the above described fractions were combined and recrystallized from a benzenel-petroleum ether mixture to give 1.54 g. of 1,2,3,4,6,7,12,12a-octahydro-2-phenylpyrazino[2',1':6,1]pyrido[3,4-b]indole, m.p. 231.6°–233.6°C. (corr.).

Anal. Calcd. for $C_{20}H_{21}N_3$: C, 79.17; H, 6.98; N, 13.85.
Found: C, 78.84; H, 7.15; N, 13.51.

EXAMPLE 40

1,2,3,4,6,7,12,12a-Octahydro-9-methoxy-2-(4-bromophenyl)-pyrazino pyrazing[2',1':6,1]pyrido[3,4-b]indole [I: $R_1$ is H; $R_2$ is 4-Br; $R_3$ is 9-$CH_3O$] is prepared by lithium aluminum hydride reduction of 1,2,3,4,6,7,12,12a-octahydro-1,4-dioxo-9-methoxy-2-(4-bromophenyl)pyrazino[2',1':6,1]pyrido[3,4-b]indole in tetrahydrofuran using the procedure above in Example 39.

EXAMPLE 41

1,2,3,4,6,7,12,12a-Octahydro-9,10-dimethoxy-2-(2,4-difluorophenyl)pyrazino[',1°:6,1]pyrido[3,4-b]indole [I: $R_1$ is H; $R_2$ is 2,4-$F_2$; $R_3$ is 9,10-$(CH_3O)_2$] is prepared by lithium aluminum hydride reduction of 1,2,3,4,6,7,12,12a-octahydro-1,4-dioxo-9,10-dimethoxy-2-(2,4-difluorophenyl)pyrazino[2',1':6,1]-pyrido[3,4-b]indole in tetrahydrofuran using the procedure described above in Example 39.

EXAMPLE 42

1,2,3,4,6,7,12,12a-Octhaydro-10-ethoxy-2-(4-chlorophenyl)-pyrazino[2',1':6,1]pyrido[3,4-b]indole [I: $R_1$ is H; $R_2$ is 4-Cl; $R_3$ is 10$C_2H_5O$] is prepared by lithium aluminum hydride reduction of 1,2,3,4,6,7,12,12a-octahydro-1,4-dioxo-10-ethoxy-2-(4-chlorophenyl)pyrazino[2',1':6,1]pyrido[3,4-b]indole in tetrahydrofuran using the procedure described above in Example 39.

EXAMPLE 43

1,2,3,4,6,7,12,12a-Octahydro-9-methyl-2-(3-methylmercaptophenyl)-pyrazino[2',1'1':6,1]pyrido[-b]indole [I: $R_1$ is H; $R_2$ is 3-$CH_3S$; $R_3$ is 9-$CH_3$] is prepared by lithium aluminum hydride reduction of 1,2,3,4,6,7,12,12a-octahydro-1,4-dioxo-9-methyl-2-(3-methylmercaptophenyl)pyrazino[2',1':6,1]pyrido[3,4-b]indole In tetrahydrofuran using the procedure described above in Example 39.

EXAMPLE 44

1,2,3,4,6,7,12,12a-Octahydro-9,11-dimethyl-2[4-(N.N-dimethylamino)phenyl]pyrazino[2',1':6,1]pyrido[3,4-b]indole [I: $R_1$ is H; $R_2$ is 4-$(CH_3)_2N$; $R_3$ is 9,11-$(CH_3)_2$] is prepared by lithium aluminum hydride reduction of 1,2,3,4,6,7,12,12a-octahydro-1,4-dioxo-9,11-dimethyl-2-[4-(N,N-dimethylamino)phenyl]pyrazino-[2',1':6,1]pyrido[3,4-b]indole in tetrahydrofuran using the procedure described above in Example 39.

EXAMPLE 45

1,2,3,4,6,7,12,12a-Octahydro-10-benzyloxy-2-(3-triflouromethylphenyl)pyrazinoii2', 1':6,1]pyrido[3,4-b]indole [I: $R_1$ is H; $R_2$ 3-$CF_3$; $R_3$ is 10-$C_6H_5CH_2O$] is prepared by lithium aluminum hydride reduction of 1,2,3,4,6,7,12,12a-octahydro-1,4-dioxo-10-benzyloxy-2-(3-trifluoromethylphenyl)pyrazino[2', 1':6,1]-pyrido[3,4-b]indole in tetrahydrofuran using the procedure described above in Example 39.

EXAMPLE 46

1,2,3,4,5,6,7,12,12a-Octahydro-9-chloro-3-methyl-2-(2,4,6,-trimethylphenyl)pyrazino[2',1':6,1]pyrido[3,4-b]indole [I: $R_1$ is $CH_3$; $R_2$ is 2, 4, 6-$(CH_3)_3$; $R_3$ is 9-Cl] is prepared by lithium aluminum hydride reduction of 1,2,3,4,6,7,12,12a-octahydro-1,4-dioxo-9-chloro-3-methyl-2-(2,4,6-trimethylphenyl)pyrazino[2', 1':6,1]-pyrido[3,4-b]indole in tetrahydrofuran using the procedure described above in Example 39.

EXAMPLE 47

1,2,3,4,6,7,12,12a-Octahydro-10-bromo-2-(3,4-methylenedioxyphenyl)pyrazino[2',1':6,1]pyrido[3,4-b]indole [I: $R_1$ is H; $R_2$ is 3,4-$OCH_2O$; $R_3$ is 10-Br] is prepared by lithium aluminum hydride reduction of 1,2,3,4,6,7,12,12a-octahydro-1,4-dioxo-10-bromo-2-(3,4-methylenedioxyphenyl)pyrazino[2',1':6,1 ]pyrido-[ 3,4-b]indole 25 in tetrahydrofuran using the procedure described above in Example 39.

EXAMPLE 48

1,2,3,4,6,7,12,12a-Octahydro-10-fluoro-2-(3,4-ethylenedioxyphenyl) pyrazino [2'1:6,1] pyrido [3, 4-b]indole [I: $R_1$ is H; $R_2$ is 3,4-$OCH_2CH_2O$; $R_3$ is 10-F] is prepared by lithium aluminum hydride reduction of 1,2,3,4,6,7,12,12a-octahydro-1,4-dioxo-10-fluoro-2-(3,4-ethylenedioxyphenyl)pyrazino[ɤpyrazino[2 ',1':6,1bipyrido[3,4-b]indole in tetrahydrofuran using the procedure described above in Example 39.

EXAMPLE 49

1,2,3,4,6,7,12,12a-Octahydro-10-iodo-2-(3,4-diethoxyphenyl)-pyrazino[2',1':6,1]pyrido[3,4-b]indole [I: $R_1$ is H; $R_2$ is 3,4-$(C_2H_5O)_2$; $R_3$ is 10-I] is prepared by lithium aluminum hydride reduction of 1,2,3,4,6,7,12,12a-octahydro-1,4-dioxo-10-iodo-2-(3,4-diethoxyphenyl)pyrazino[2',1':6,1]pyrido[3,4-b]-indole in tetrahydrofuran using the procedure described above in Example 39.

EXAMPLE 50

1,2,3,4,6,7,12,12a-Octahydro-3-ethyl-9-hydroxy-2-(4-isopropylphenyl)pyrazino[2', 1':6,1]pyrido[3,4-b]indole [I: $R_1$ is $C_2H_5$; $R_2$ is 4-$(CH_3)_2CH$; $R_3$ is 9-HO] is prepared by lithium aluminum hydride reduction of 1,2,3,4,6,7,12,12a-octahydro-1,4-dioxo-3-ethyl-9-hydroxy-2-(4-isopropylphenyl)pyrazino-[2', 1':6,1]pyrido[3,4-b]indole in tetrahydrofuran using the procedure described above in Example 39.

EXAMPLE 51

1,2,3,4,6,7,12,12a-Octahydro-9-trifluoromethyl-2-(3-hydroxyphenyl)pyrazino[',1':6,1]pyrido[3,4-b]indole [I: $R_1$ is H; $R_2$ is 3-HO; $R_3$ is 9-$CF_3$] is prepared by lithium aluminum hydride reduction of 1,2,3,4,6,7,12,12a-octahydro-1,4-dioxo-9-trifluoromethyl-2-(3-hydroxyphenyl)pyrazino[2',1':6,1]pyrido[3,4-b]indole in tetrahydrofuran using the procedure described above in Example 39.

EXAMPLE 52

1,2,3,4,6,7,12,12a-Octahydro-10-methylmercapto-2-phenylpyrazino-[2',1':6,1]pyrido[3,4-b]indole [I: $R_1$ is H; $R_2$ is H; $R_3$ is 10-$CH_3S$] is prepared by lithium aluminum hydride reduction of 1,2,3,4,6,7,12,12a-octahydro-1,4-dioxo-9,10-methylenedioxy-2-phenyl pyrazino[2',1':6,1]pyrido[3,4-b]indole in tetrahydrofuran using the procedure described above in Example 39.

EXAMPLE 53

1,2,3,4,6,7,12,12a-Octahydro-9,10-methylenedioxy-2-phenylpyrazino-[2',1':6,1]pyrido[3,4-b]indole [I: $R_1$ is H; $R_2$ is H; $R_3$ is 9,10-$OCH_2O$] is prepared by lithium aluminum hydride reduction of 1,2,3,4,6,7,12,12a-octahydro-1,4-dioxo-9,10-methylenedioxy-2-phenylpyrazino[2',1':6,1]pyrido[3,4-b]indole in tetrahydrofuran using the procedure described above in Example 39.

EXAMPLE 54

1,2,3,4,6,7,12,12a-Octahydro-9-amino-2-phenylpyrazino[2',1':6,1]-pyrido[3,4-b]indole [I; $R_1$ is H; $R_2$ is H; $R_3$ is 9-$NH_2$] is prepared by lithium aluminum hydride reduction of 1,2,3,4,6,7,12,12a-octahydro-1,4-dioxo-9-amino-2-phenylpyrazino[2',1':6,1]-pyrido[3,4-b]indole in tetrahydrofuran using the procedure described above in Example 39.

EXAMPLE 55

1,2,3,4,6,7,12,12a-Octahydro-10-dimethylamino-2-phenylpyrazino-[2',1':6,1]pyrido[3,4-b]indole [I: $R_1$ is H; $R_2$ is H; $R_3$ is 10-$(CH_3)_2N$] is prepared by lithium aluminum hydride reduction of 1,2,3,4,6,7,12,12a-octahydro-1,4-dioxo-10-dimethylamino-2-phenylpyrazino[2',1':6,1]pyrido[3,4-b]indole in tetrahydrofuran using the procedure described above in Example 39.

EXAMPLE 56

1,2,3,4,6,7,12,12a-Octahydro-10-methyl-8-chloro-2-phenylpyrazino-[2',1':6,1]pyrido[3,4-b]indole [I: $R_1$ is H; $R_2$ is H; $R_3$ is 10-$CH_3$-8-Cl] is prepared by lithium aluminum hydride reduction of 1,2,3,4,6,7,12,12a-octahydro-1,4-dioxo-10-methyl-8-chloro-2-phenylpyrazino[2',1':6,1]pyrido[3,4-b]indole in tetrahydrofuran using the procedure described above in Example 39.

EXAMPLE 57

1,2,3,4,6,7,12,12a-Octahydro-9,10-ethylenedioxy-2-phenylpyrazino-[2',1':6,1]pyrido[3,4-b]indole [I: $R_1$ is H; $R_2$ is H; $R_3$ is 9,10-$OCH_2CH_2O$] is prepared by lithium aluminum hydride reduction of 1,2,3,4,6,7,12,12a-octahydro-1,4-dioxo-9,10-ethylenedioxy-2-phenylpyrazino[2',1':6,1]pyrido[3,4-b]indole in tetrahydrofuran using the procedure described above in Example 39.

I claim:
1. A compound having the formula

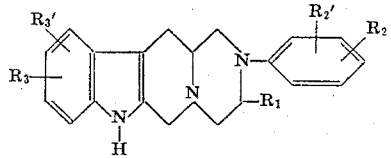

wherein $R_1$ is hydrogen or lower-alkyl; and $R_2$, $R_2'$, $R_3$ and $R_3'$ are each a member of the group consisting of hydrogen, halogen, lower-alkyl, lower-alkoxy, lower-alkylmercapto, amino, di-lower-alkylamino, trifluoromethyl, or hydroxy in other than the eight-position, or $R_2$ and $R_2'$ together or $R_3$ and $R_3'$ together represent methylenedioxy or ethylenedioxy attached to adjacent carbon atoms, and wherein each of the lower-alkyl containing moieties is sterically accommodatable alkyl containing from one to six carbon atoms.

2. A compound according to claim 1 wherein $R_1$, $R_2$ and $R_2'$ are each hydrogen.

3. 1,2,3,4,6,7,12,12a-Octahydro-2-phenylpyrazino[2,'1':6,1]pyrido[3,4-b]indole according to claim 2 wherein $R_3$ and $R_3'$ are each hydrogen.

4. A compound having the formula

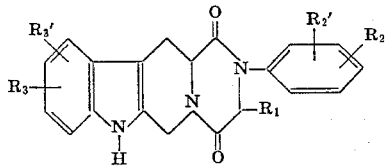

wherein $R_1$ is hydrogen or lower-alkyl; and $R_2$, $R_2'$, $R_3$ and $R_3'$ are each a member of the group consisting of hydrogen, halogen, lower-alkyl, lower-alkoxy, lower-alkylmercapto, amino, di-lower-alkylamino, trifluoromethyl, or hydroxy in other than the eight-position, or $R_2$ and $R_2'$ together or $R_3$ and $R_3'$ together represent methylenedioxy or ethylenedioxy attached to adjacent carbon atoms, and wherein each of the lower-alkyl containing moieties is sterically accommodatable alkyl containing from one to six carbon atoms.

5. A compound according to claim 4 wherein $R_1$, $R_2$ and $R_2'$ are each hydrogen.

6. 1,2,3,4,6,7,12,12a-Octahydro-1,4-dioxo-2-phenylpyrazino[2'':6,1]pyrido[3,4-b]indole according to claim 5 wherein $R_3$ and $R_3'$ are each hydrogen.

* * * * *

UNITED STATES PATENT AND TRADEMARK OFFICE
CERTIFICATE OF CORRECTION

PATENT NO. : 3,717,638
DATED : February 20, 1973
INVENTOR(S) : John W. Schulenberg It is certified that error appears in the above—identified patent and that said Letters Patent are hereby corrected as shown below:

Column 1, lines 7 and 8, delete "ORGANIC COMPOUNDS AND THEIR PREPARATION."

Column 2, line 23, change "formual" to read - -formula--.

Column 2, line 61, "with in i" should read - -with formaldehyde in - -.

Column 3, line 21, change "Therefor" to read - -Therefore- -.

Column 4, line 3, delete "Example".

Column 4, lines 16 and 17, change "energizes to read - -energizers- -.

Signed and Sealed this

Twenty-first Day of June 1983

[SEAL]

Attest:

DONALD J. QUIGG

Attesting Officer

Acting Commissioner of Patents and Trademarks